United States Patent
Imai (10) Patent No.: US 11,789,426 B2
(45) Date of Patent: Oct. 17, 2023

(54) MOTOR CONTROL ANGLE SENSOR, MOTOR CONTROL SYSTEM, AND CONTROL METHOD FOR MOTOR CONTROL ANGLE SENSOR

(71) Applicant: Seiko Epson Corporation, Tokyo (JP)

(72) Inventor: Ryosuke Imai, Matsumoto (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/536,264

(22) Filed: Nov. 29, 2021

(65) Prior Publication Data
US 2022/0171362 A1 Jun. 2, 2022

(30) Foreign Application Priority Data
Nov. 30, 2020 (JP) .................. 2020-198146

(51) Int. Cl.
*G05B 19/402* (2006.01)
*B25J 9/12* (2006.01)

(52) U.S. Cl.
CPC .............. *G05B 19/402* (2013.01); *B25J 9/12* (2013.01); *G05B 2219/34465* (2013.01); *G05B 2219/39001* (2013.01)

(58) Field of Classification Search
CPC . B25J 13/088; B25J 9/12; B25J 9/1674; B25J 17/00; B25J 18/00; B25J 15/00; B25J 13/00; B25J 9/00; B25J 1/00; G05B 19/402; G05B 2219/34465; G05B 2219/39001; G05B 2219/39412; G05B 2219/50102; G05B 11/00; G05B 15/00; G05B 19/00
See application file for complete search history.

(56) References Cited

U.S. PATENT DOCUMENTS

| | | | | |
|---|---|---|---|---|
| 4,467,436 | A * | 8/1984 | Chance | G05B 19/4141 700/249 |
| 2008/0144693 | A1 * | 6/2008 | Sato | G01K 15/00 374/1 |
| 2015/0123589 | A1 | 5/2015 | Matsutani | |
| 2016/0149532 | A1 * | 5/2016 | Goto | H02P 29/024 318/490 |
| 2017/0197310 | A1 * | 7/2017 | Aurnhammer | B25J 9/1664 |
| 2019/0168389 | A1 * | 6/2019 | Shino | B25J 13/088 |

FOREIGN PATENT DOCUMENTS

| | | |
|---|---|---|
| CN | 104614001 A | 5/2015 |
| JP | H04-130503 A | 5/1992 |

\* cited by examiner

*Primary Examiner* — Kidest Bahta
(74) *Attorney, Agent, or Firm* — Harness, Dickey & Pierce, P.L.C.

(57) ABSTRACT

A motor control angle sensor includes a sensor that outputs a signal according to driving of a motor, an arithmetic processing unit, a motion history temporary memory unit, and a motion history storage unit, wherein the arithmetic processing unit generates position information data containing a position of the motor acquired based on the signal output from the sensor and a time when the position is acquired, repeats processing of storing the generated position information data in the motion history temporary memory unit, and, when an abnormality is sensed or a signal reporting an abnormality is received from an external apparatus, stores the position information data stored in the motion history temporary memory unit in the motion history storage unit.

8 Claims, 11 Drawing Sheets

MOTOR CONTROL ANGLE SENSOR, MOTOR CONTROL SYSTEM, AND CONTROL METHOD FOR MOTOR CONTROL ANGLE SENSOR

The present application is based on, and claims priority from JP Application Serial Number 2020-198146, filed Nov. 30, 2020, the disclosure of which is hereby incorporated by reference herein in its entirety.

BACKGROUND

1. Technical Field

The present disclosure relates to a motor control angle sensor, a motor control system, and a control method for a motor control angle sensor.

2. Related Art

JP-A-4-130503 discloses a robot control apparatus that leaves a motion history at a time of an error in a failure history memory unit within the control apparatus when an abnormality occurs in motion of a robot and facilitates a subsequent analysis of a cause of an error.

However, in the configuration, it is necessary to analyze the robot control apparatus having the failure history memory unit in order to analyze the cause of the error. Accordingly, for example, even when an abnormality occurs in an angle sensor that detects a rotation amount of a motor used for driving of the robot, it is necessary to analyze the robot control apparatus, not the angle sensor. The robot control apparatus has a larger size than the angle sensor and has a problem of increase in transport cost for analysis and reduction in flexibility for analysis.

SUMMARY

A motor control angle sensor according to an aspect of the present disclosure includes a sensor that outputs a signal according to driving of a motor, an arithmetic processing unit, a motion history temporary memory unit, and a motion history storage unit, wherein the arithmetic processing unit generates position information data containing a position of the motor acquired based on the signal output from the sensor and a time when the position is acquired, repeats processing of storing the generated position information data in the motion history temporary memory unit, and, when an abnormality is sensed or a signal reporting an abnormality is received from an external apparatus, stores the position information data stored in the motion history temporary memory unit in the motion history storage unit.

A motor control system according to an aspect of the present disclosure includes a motor, a sensor that outputs a signal according to driving of the motor, an arithmetic processing unit, a motion history temporary memory unit, a motion history storage unit, and a control apparatus that controls the driving of the motor, wherein the arithmetic processing unit generates position information data containing a position of the motor acquired based on the signal output from the sensor and a time when the position is acquired, repeats processing of storing the generated position information data in the motion history temporary memory unit, and, when an abnormality is sensed or a signal reporting an abnormality is received from the control apparatus, stores the position information data stored in the motion history temporary memory unit in the motion history storage unit.

A control method for a motor control angle sensor according to an aspect of the present disclosure is a control method for a motor control angle sensor having a motor, a sensor that outputs a signal according to driving of a motor, an arithmetic processing unit, a motion history temporary memory unit, a motion history storage unit, and a control apparatus that controls the driving of the motor, the method including: generating position information data containing a position of the motor acquired based on the signal output from the sensor and a time when the position is acquired at each time when receiving a request signal from the control apparatus, repeating processing of storing the generated position information data in the motion history temporary memory unit, and, when an abnormality is sensed or a signal reporting an abnormality is received from the control apparatus, storing the position information data stored in the motion history temporary memory unit in the motion history storage unit by the arithmetic processing unit.

DESCRIPTION OF EXEMPLARY EMBODIMENTS

As below, a motor control angle sensor, a motor control system, and a control method for a motor control angle sensor according to the present disclosure will be explained in detail with reference to preferred embodiments shown in the accompanying drawings.

Figure 1:
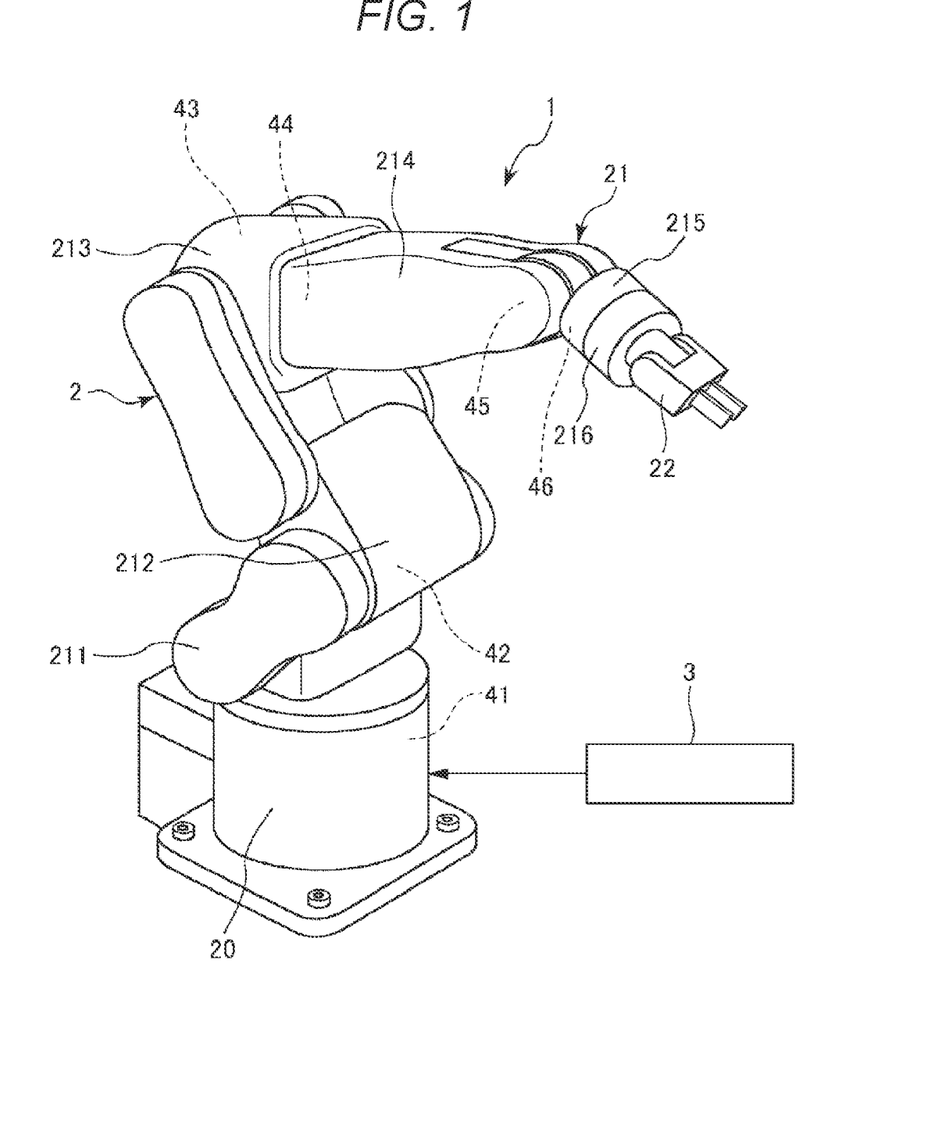
FIG. 1 is an overall view showing a robot system according to an embodiment of the present disclosure.
Figure 2:
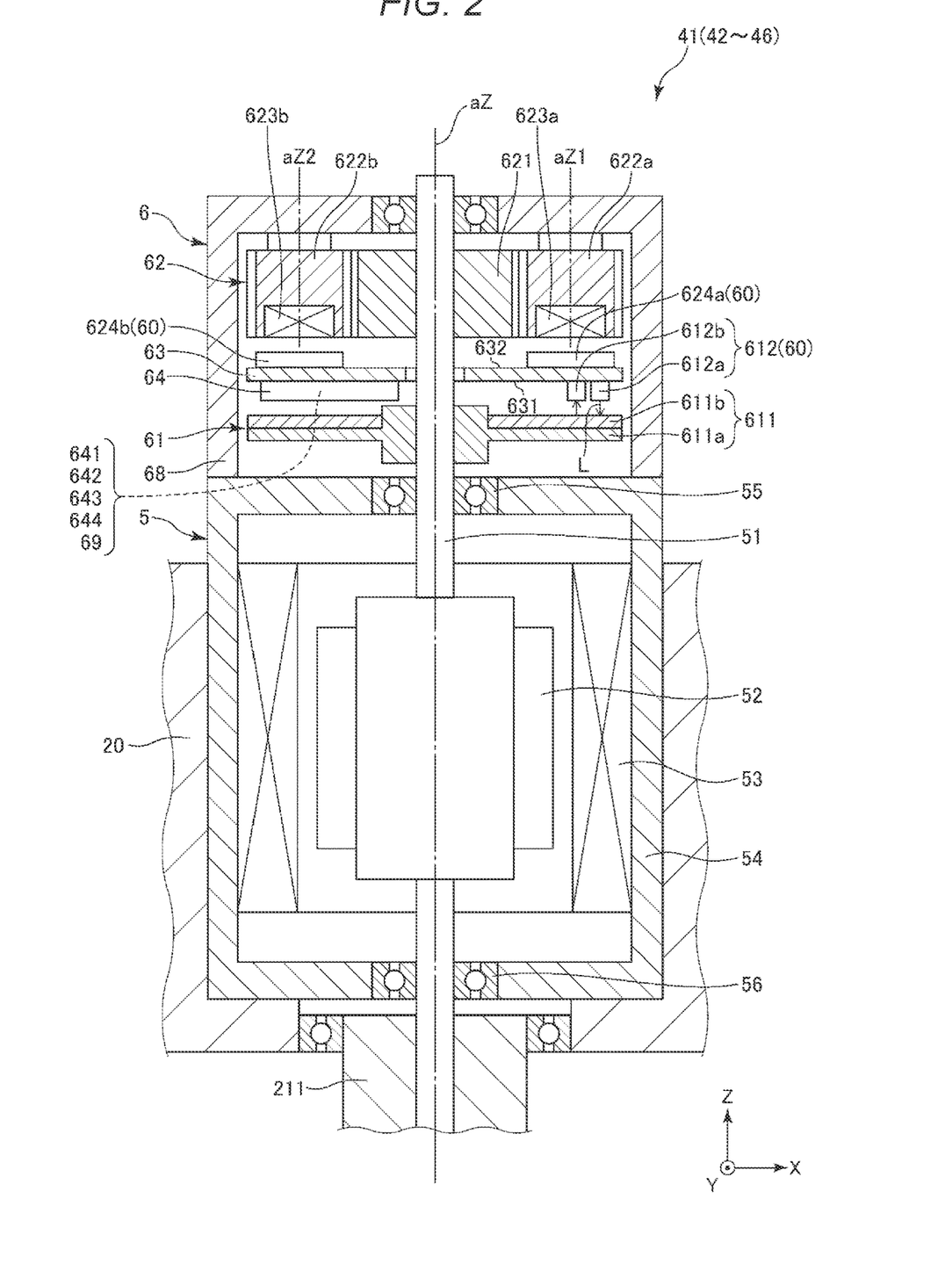
FIG. 2 is a sectional view of a drive device.
Figure 3:
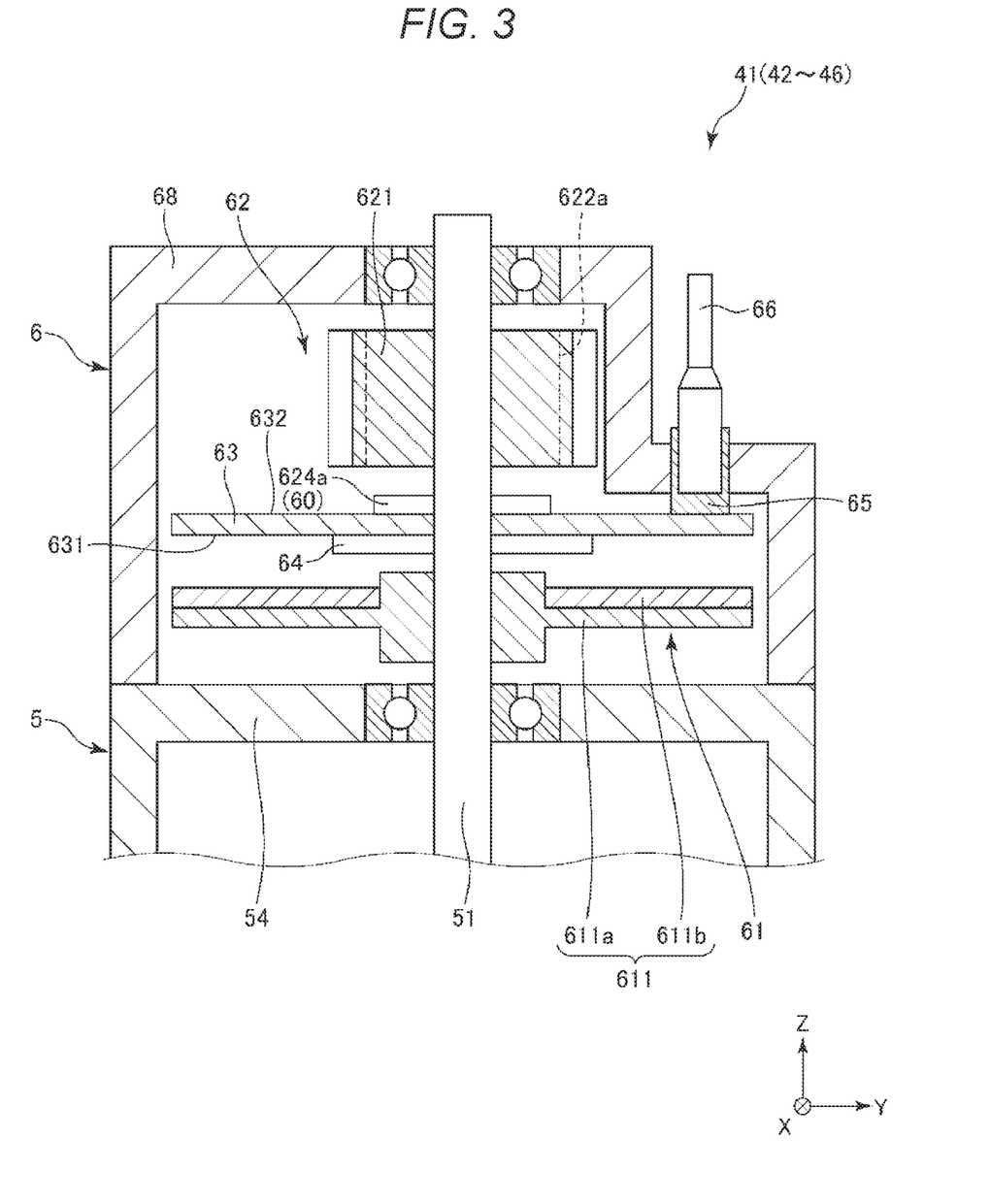
FIG. 3 is a sectional view of the drive device.
Figure 4:
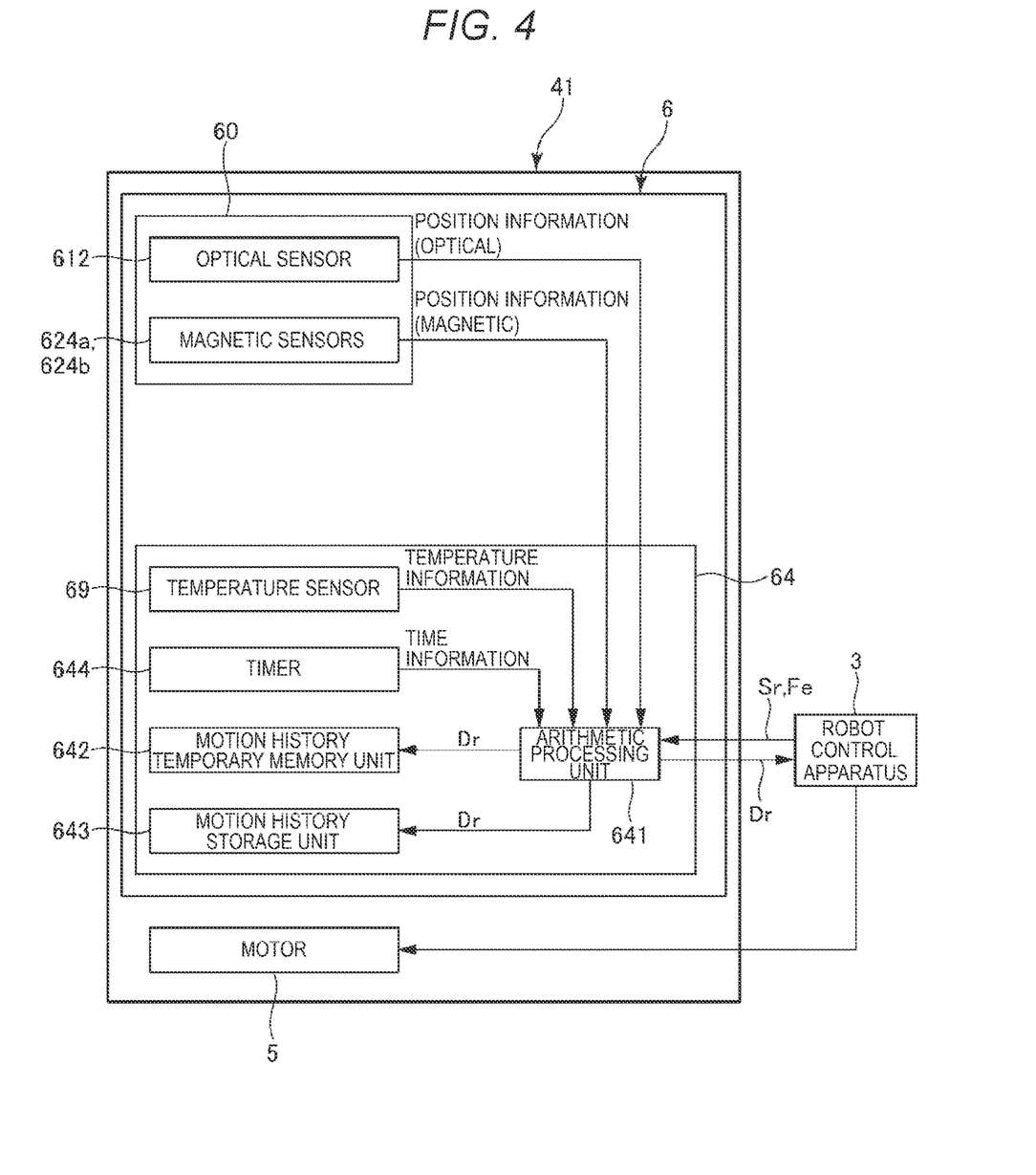
FIG. 4 is a block diagram of the drive device.
Figure 5:
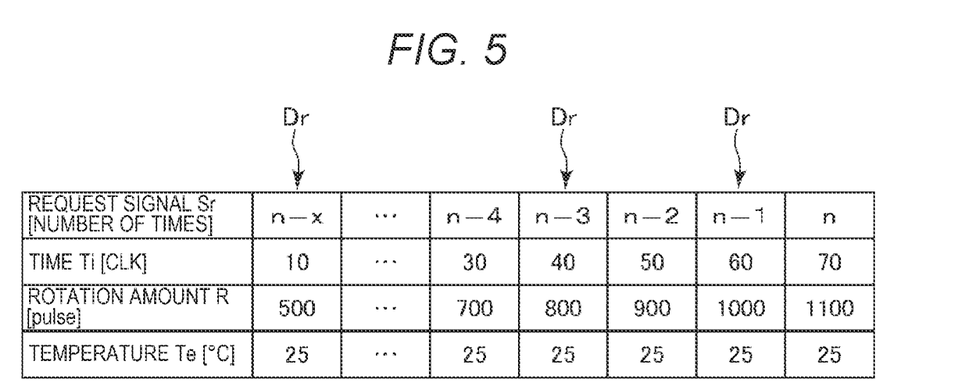
FIG. 5 shows examples of position information data generated by an arithmetic processing unit of the drive device.
Figure 6:
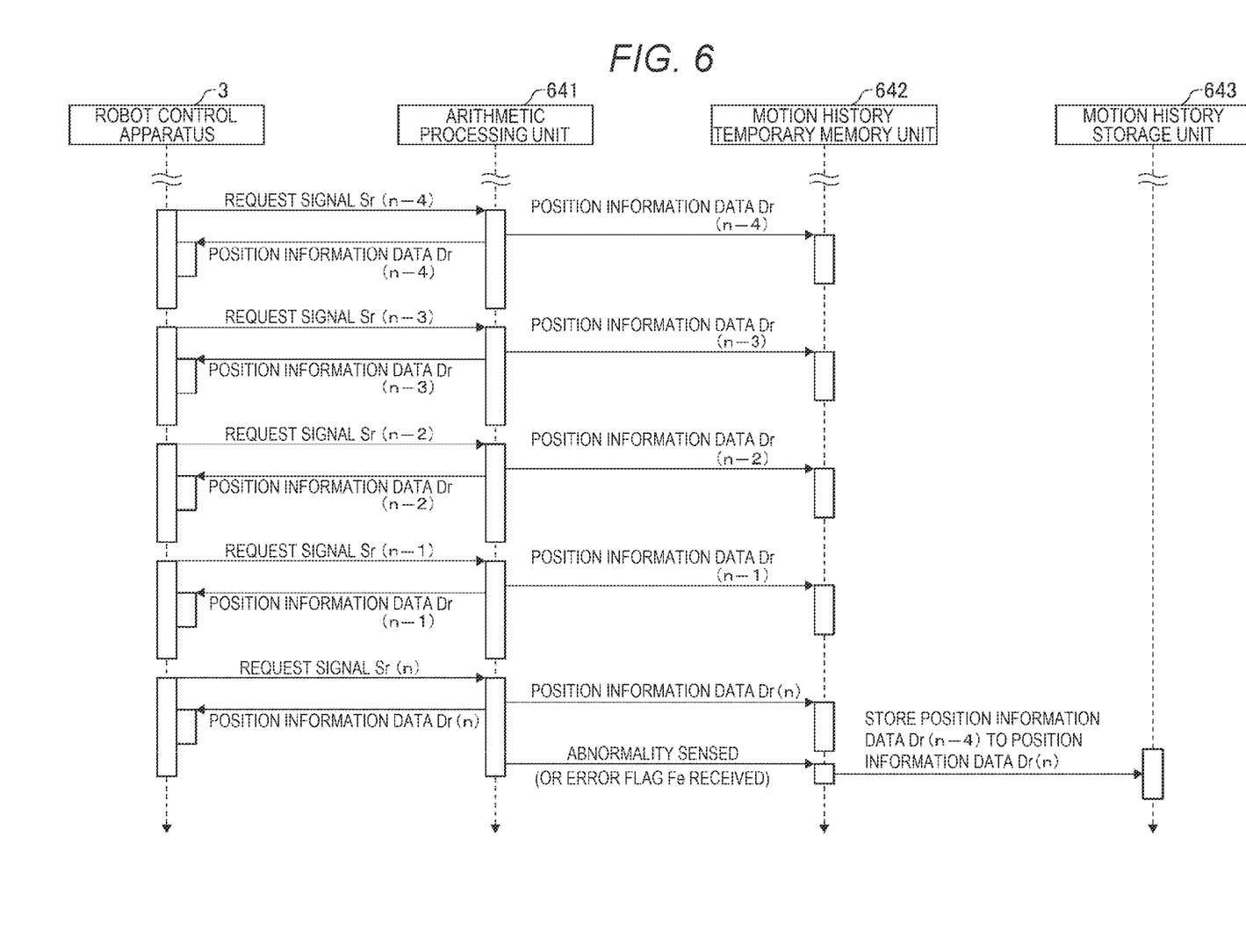
FIG. 6 is a flowchart showing processing steps of the arithmetic processing unit of the drive device.

FIG. 1 is an overall view showing a robot system according to an embodiment of the present disclosure. FIGS. 2 and 3 are respectively sectional views of a drive device. FIG. 4 is a block diagram of the drive device. FIG. 5 shows examples of position information data generated by an arithmetic processing unit of the drive device. FIG. 6 is a flowchart showing processing steps of the arithmetic processing unit of the drive device. FIGS. 7 to 10 are graphs for explanation of a method of detecting an abnormality of the arithmetic processing unit of the drive device.

FIGS. 2 and 3 show an X-axis, a Y-axis, and a Z-axis as three axes orthogonal to one another. The pointer sides of the respective arrows showing the X-axis, the Y-axis, and the Z-axis are "+" and the tail sides are "−". Directions parallel to the X-axis are referred to as "X-axis directions", directions parallel to the Y-axis are referred to as "Y-axis directions", and directions parallel to the Z-axis are referred to as "Z-axis directions". A side in the +Z-axis direction is also referred to as "upper" and a side in the −Z-axis direction is also referred to as "lower". FIG. 3 is the sectional view formed by rotation of FIG. 2 around the Z-axis by 90°.

The robot system 1 shown in FIG. 1 may perform work of feeding, removing, transport, assembly, etc. of precision apparatuses and components forming the apparatuses. The robot system 1 has a robot 2 that executes predetermined work and a robot control apparatus 3 as an external apparatus that controls driving of the robot 2.

The robot 2 is a six-axis robot. The robot 2 has a base 20 fixed to a floor, a wall, a ceiling, or the like, a robot arm 21 supported by the base 20, and an end effector 22 attached to the distal end of the robot arm 21. Further, the robot arm 21 has an arm 211 pivotably coupled to the base 20, an arm 212 pivotably coupled to the arm 211, an arm 213 pivotably coupled to the arm 212, an arm 214 pivotably coupled to the arm 213, an arm 215 pivotably coupled to the arm 214, and an arm 216 pivotably coupled to the arm 215. The end effector 22 is attached to the arm 216.

Note that the configuration of the robot 2 is not particularly limited. For example, the number of arms may be one to five, seven, or more. Or, for example, the robot 2 may be a scalar robot, a dual-arm robot, or the like.

The robot 2 has a drive device 41 that pivots the arm 211 relative to the base 20, a drive device 42 that pivots the arm 212 relative to the arm 211, a drive device 43 that pivots the arm 213 relative to the arm 212, a drive device 44 that pivots the arm 214 relative to the arm 213, a drive device 45 that pivots the arm 215 relative to the arm 214, and a drive device 46 that pivots the arm 216 relative to the arm 215. These drive devices 41 to 46 are respectively independently controlled by the robot control apparatus 3.

The robot control apparatus 3 receives a position command from a host computer (not shown) and independently controls driving of the drive devices 41 to 46 so that the arms 221 to 226 may be located in positions according to the position command. The robot control apparatus 3 includes e.g. a computer and has a processor (CPU) that processes information, a memory communicably connected to the processor, and an external interface. In the memory, various programs that can be executed by the processor are stored. The processor may read and execute the various programs etc. stored in the memory.

Next, the drive devices 41 to 46 will be explained. These have the same configuration as one another, and only the drive device 41 will be representatively explained and the explanation of the other drive devices 42 to 46 will be omitted. The drive device 41 is a motor control system and, as shown in FIG. 2, has a motor 5 and a motor control angle sensor 6 that detects a rotation state of the rotation shaft of the motor 5.

The motor 5 includes various motors e.g. a two-phase AC brushless motor, a three-phase AC brushless motor, a three-phase synchronous motor, etc. The motor 5 has a rotation shaft 51 placed along an axial line aZ parallel to the Z-axis, a rotor 52 fixed to the rotation shaft 51, a stator 53 placed around the rotor 52, a tubular housing 54 housing these parts and supporting the stator 53, and bearings 55, 56 rotatably supporting the rotation shaft 51 around the axial line aZ relative to the housing 54. Further, the housing 54 is fixed to the base 20. The arm 211 is coupled to an end of the rotation shaft 51 at an opposite side to the motor control angle sensor 6. Thereby, the output of the motor 5 is transmitted from the base 20 to the arm 211 and the arm 211 pivots relative to the base 20. Note that the rotation shaft 51 may be coupled to the arm 211 via a gearing such as a reducer as necessary.

The motor control angle sensor 6 is an encoder unit and placed at the upside, i.e., the +Z-axis side of the motor 5. The motor control angle sensor 6 has a rotation angle detection optical encoder 61, a multi-rotation detection magnetic encoder 62, and a substrate 63. These respective parts are housed within a housing 68 fixed to the housing 54.

The optical encoder 61 is a reflective optical encoder and has an optical scale 611 fixed to the rotation shaft 51 of the motor 5, and an optical sensor 612 detecting the rotation state of the optical scale 611. The optical scale 611 rotates around the axial line aZ with the rotation shaft 51. The optical scale 611 has a hub 611a fixed to the rotation shaft 51 of the motor 5 and a disk 611b fixed to the hub 611a. A detection pattern (not shown) for detection of the rotation angle and the rotation speed of the disk 611b is formed on the upper surface of the disk 611b. The detection pattern is not particularly limited to, but includes e.g. a pattern in which two areas having different reflectances of light, i.e., a reflection area and a non-reflection area are alternately arranged along the circumferential direction around the axial line aZ.

The optical sensor 612 is placed apart from the disk 611b on the upside of the disk 611b. The optical sensor 612 has a light emitting device 612a that outputs light L toward the detection pattern on the disk 611b and a light receiving device 612b that receives the light L reflected by the detection pattern. The light emitting device 612a is e.g. a laser diode or a light emitting diode, and the light receiving device 612b is e.g. a photodiode. In the optical encoder 61 having the above described configuration, the waveform of the output signal from the light receiving device 612b changes with the rotation of the disk 611b around the axial line aZ. Accordingly, a rotation angle θ within a 360°-range of the disk 611b may be detected based on the output signal. Note that the configuration of the optical encoder 61 is not particularly limited.

The magnetic encoder 62 is placed at the upside, i.e., the +Z-axis side of the optical sensor 612. The magnetic encoder 62 has a main gear 621 fixed to the rotation shaft 51, two auxiliary gears 622a, 622b meshing with the main gear 621, magnets 623a, 623b fixed to the auxiliary gears 622a, 622b, and magnetic sensors 624a, 624b detecting the rotation states of the magnets 623a, 623b.

The main gear 621 rotates around the axial line aZ with the rotation shaft 51. The auxiliary gear 622a is rotatably axially supported around an axial line aZ1 parallel to the axial line aZ and rotates to follow the main gear 621 in a rotation amount according to a gear ratio to the main gear 621. Similarly, the auxiliary gear 622b is rotatably axially supported around an axial line aZ2 parallel to the axial line aZ and rotates to follow the main gear 621 in a rotation amount according to a gear ratio to the main gear 621. The numbers of teeth of the main gear 621, the auxiliary gear 622a, and the auxiliary gear 622b are different from one another and particularly have relatively prime relationships with one another in the embodiment.

The magnet 623a is fixed to the auxiliary gear 622a. Accordingly, the magnet 623a rotates around the axial line aZ1 with the auxiliary gear 622a. Similarly, the magnet 623b is fixed to the auxiliary gear 622b. Accordingly, the magnet 623b rotates around the axial line aZ2 with the auxiliary gear 622b. The magnets 623a, 623b are permanent magnets e.g. neodymium magnets, ferrite magnets, samarium-cobalt magnets, alnico magnets, bond magnets, or the like, and placed so that directions of magnetic fields may change with rotations around the axial lines aZ1, aZ2.

The magnetic sensors 624a, 624b are placed at the downside, i.e., the −Z-axis side of the magnets 623a, 623b. The magnetic sensor 624a is placed to face the magnet 623a and outputs a signal according to the rotation angle in the direction of the magnetic field of the magnet 623a, i.e., within a 360°-range of the auxiliary gear 622a. On the other hand, the magnetic sensor 624b is placed to face the magnet 623b and outputs a signal according to the rotation angle in the direction of the magnetic field of the magnet 623b, i.e., within a 360°-range of the auxiliary gear 622b. In the magnetic encoder 62 having the above described configuration, a rotation number n of the rotation shaft 51 may be detected by a combination of values of the signals from the magnetic sensors 624a, 624b. Note that the configuration of the magnetic encoder 62 is not particularly limited.

The substrate 63 is placed between the optical encoder 61 and the magnetic encoder 62. The substrate 63 is a wiring board and fixed to the housing 68. The optical sensor 612 is mounted on a lower surface 631 of the substrate 63 to face the optical sensor 611 and the magnetic sensors 624a, 624b are mounted on an upper surface 632 to face the magnets 623a, 623b.

A semiconductor device 64 electrically coupled to the optical sensor 612 and the magnetic sensors 624a, 624b is mounted in a position not overlapping with optical sensor 612 on the lower surface 631 of the substrate 63. The semiconductor device 64 includes e.g. a computer and has a processor (CPU) that processes information, a memory communicably connected to the processor, and an external interface. In the memory, various programs that can be executed by the processor are stored. The processor may read and execute the various programs etc. stored in the memory.

Further, as shown in FIG. 3, a connector 65 is mounted on the upper surface 632 of the substrate 63. The semiconductor device 64 and the robot control apparatus 3 are electrically coupled via a wire 66 coupled to the connector 65.

As above, the configuration of the drive device 41 is explained. Hereinafter, the optical sensor 612 and the magnetic sensors 624a, 624b are also referred to as "sensor 60". Next, the semiconductor device 64 contained in the drive device 41 is explained in detail. As shown in FIG. 4, the semiconductor device 64 has an arithmetic processing unit 641, a motion history temporary memory unit 642, a motion history storage unit 643, a timer 644, and a temperature sensor 69. As described above, the arithmetic processing unit 641, the motion history temporary memory unit 642, the motion history storage unit 643, the timer 644, and the temperature sensor 69 are provided in the single semiconductor device 64, and thereby, the drive device 41 may be downsized. However, at least one of these units may be provided outside of the semiconductor device 64.

The motion history temporary memory unit 642 is a RAM (random access memory) and the motion history storage unit 643 is a ROM (read only memory). Accordingly, the data stored in the motion history temporary memory unit 642 is deleted when the power of the drive device 41 is turned off and the data stored in the motion history storage unit 643 remains stored even when the power of the drive device 41 is turned off. The temperature sensor 69 detects the temperature of the motor 5.

The arithmetic processing unit 641 detects a rotation amount R of the rotation shaft 51 based on the output of the sensor 60. Specifically, the rotation number n of the rotation shaft 51 of the motor 5 is detected based on the output of the magnetic sensors 624a, 624b when power is turned on, and then, detects the rotation amount R by addition or subtraction of the rotation angle θ of the rotation shaft 51 detected based on the output (pulse signal) of the optical sensor 612 to or from the detected rotation number n. Note that the detection method of the rotation amount R is not particularly limited.

As shown in FIG. 5, the arithmetic processing unit 641 generates position information data Dr containing the rotation amount R, a time Ti when the rotation amount R is acquired, and a temperature Te of the motor 5 at the time Ti when the rotation amount R is acquired. Then, the arithmetic processing unit 641 performs processing of temporarily storing the generated position information data Dr in the motion history temporary memory unit 642 and performs processing of transmitting the data to the robot control apparatus 3. Note that the time Ti is a time based on a clock generated by the timer 644 and shown by the number of counts. Further, the temperature Te of the motor 5 is a temperature detected by the temperature sensor 69.

As shown in FIG. 6, the arithmetic processing unit 641 generates the position information data Dr at each time when a request signal Sr transmitted from the robot control apparatus 3 at regular intervals is received, and temporarily stores the generated position information data Dr in the motion history temporary memory unit 642 and transmits the data to the robot control apparatus 3. Thereby, unnecessary generation and transmission of the position information data Dr may be prevented and processing load may be reduced. When sensing an abnormality of the drive device 41 or receiving an error flag Fe as a signal reporting an abnormality from the robot control apparatus 3 during the repeated operation of the processing, the arithmetic processing unit 641 selects the necessary position information data Dr from the many pieces of position information data Dr continuously stored in the motion history temporary memory unit 642 at each time when receiving the request signal Sr, and stores the data in the motion history storage unit 643 with a time and date when an abnormality occurs connected thereto.

In the example shown in FIG. 6, the arithmetic processing unit 641 senses an abnormality of the drive device 41 based on the position information data Dr corresponding to the nth request signal Sr, and accordingly, selects the position information data Dr corresponding to the last five pieces of position information data Dr, i.e., from the position information data Dr corresponding to the (n−4)th request signal Sr to the position information data Dr corresponding to the nth request signal Sr of the many pieces of position information data Dr generated from power-on to the nth request signal Sr and stored in the motion history temporary memory unit 642, and connects the data to a time and date when an abnormality occurs, i.e., a time and date corresponding to the time Ti corresponding to the nth request signal Sr and stores the data in the motion history storage unit 643.

Thereby, the position information data Dr at the last plurality of times containing the time when the abnormality of the drive device 41 is sensed is stored even when the power is turned off. Accordingly, the position information data Dr stored in the motion history storage unit 643 is subsequently analyzed, and thereby, a cause of the abnormality can be analyzed. The drive device 41 has a smaller size than the robot control apparatus 3, and thereby, the transport cost for abnormality analysis may be reduced and flexibility for analysis may be improved compared to those in related art. Further, reproduction of an abnormality is unnecessary and the abnormality analysis may be easily performed. The position information data Dr contains the temperature Te, and thereby, the condition of the motor 5 when an abnormality occurs may be checked and the abnormality analysis may be performed more accurately.

Here, the motion history temporary memory unit 642 is formed using a ring buffer. Thereby, the latest position information data Dr may be sequentially stored. Further, the capacity of the motion history temporary memory unit 642 may be reduced, that is, in the above described example, only capacity that may store at least five pieces of position information data Dr is necessary, and the cost of the drive device 41 may be reduced.

The number of pieces of position information data Dr stored in the motion history storage unit 643 is not limited to five, but may be appropriately set. Or, for example, all pieces of position information data Dr temporarily stored in the motion history temporary memory unit 642 may be stored in the motion history storage unit 643. That is, all pieces of position information data Dr generated after the power is turned on and before an abnormality is sensed may be stored in the motion history storage unit 643. Or, the position information data Dr not only before an abnormality is sensed but also after the sensing may be stored in the motion history storage unit 643. For example, when an abnormality of position information data Dr corresponding to the nth request signal Sr is sensed, from the position information data Dr corresponding to the (n−4)th request signal Sr to the position information data Dr corresponding to the (n+4)th request signal Sr may be stored in the motion history storage unit 643. Thereby, whether the abnormality is sudden or chronic may be easily analyzed.

Figure 7:
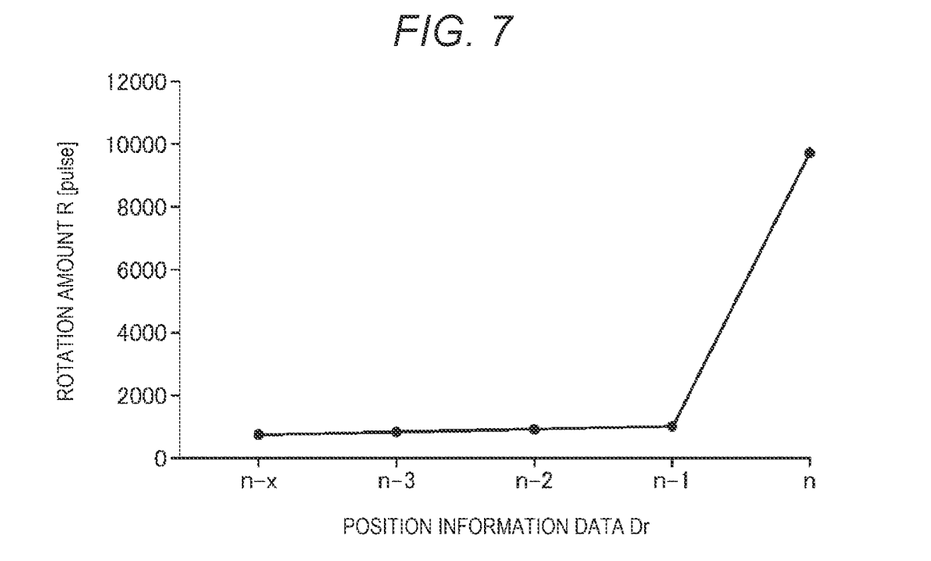
FIG. 7 is a graph for explanation of a method of detecting an abnormality of the arithmetic processing unit of the drive device.
Figure 8:
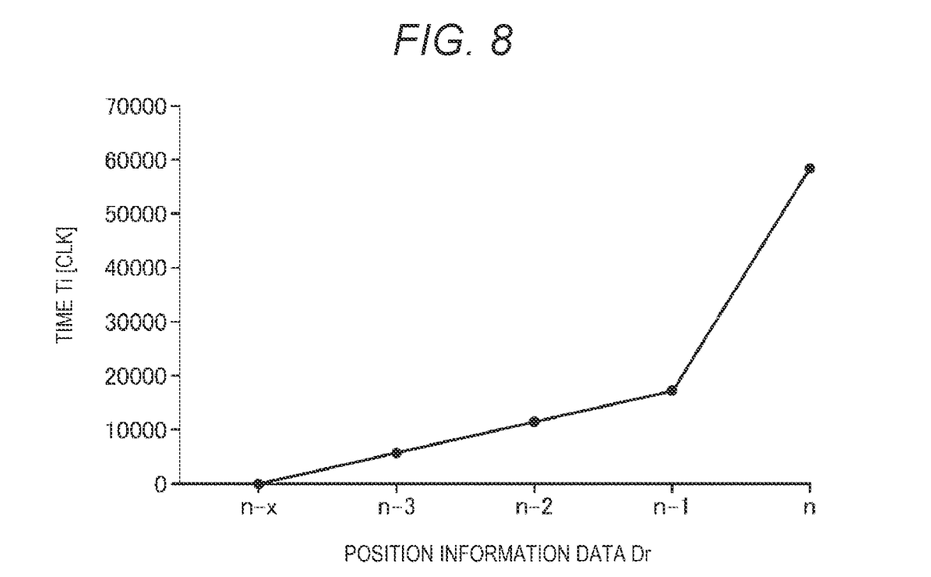
FIG. 8 is a graph for explanation of the method of detecting the abnormality of the arithmetic processing unit of the drive device.
Figure 9:
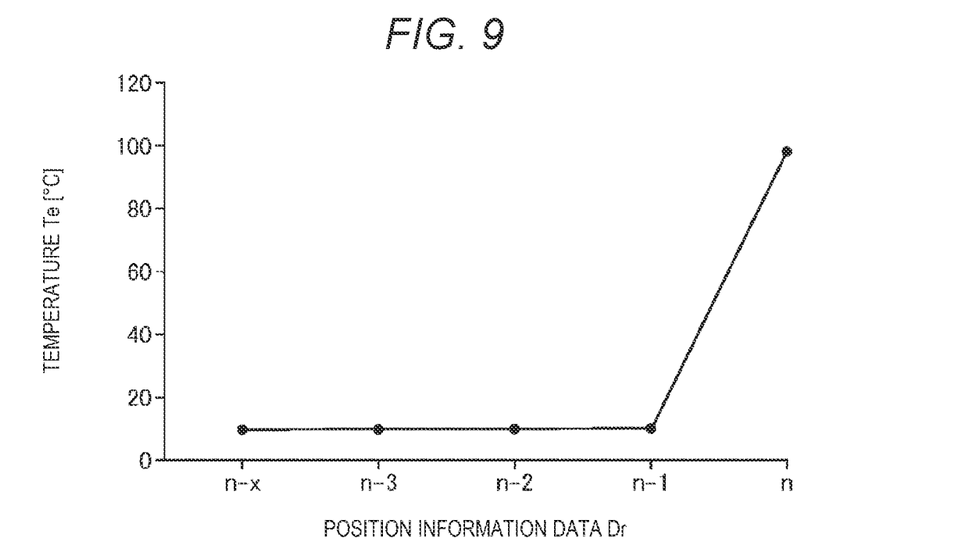
FIG. 9 is a graph for explanation of the method of detecting the abnormality of the arithmetic processing unit of the drive device.
Figure 10:
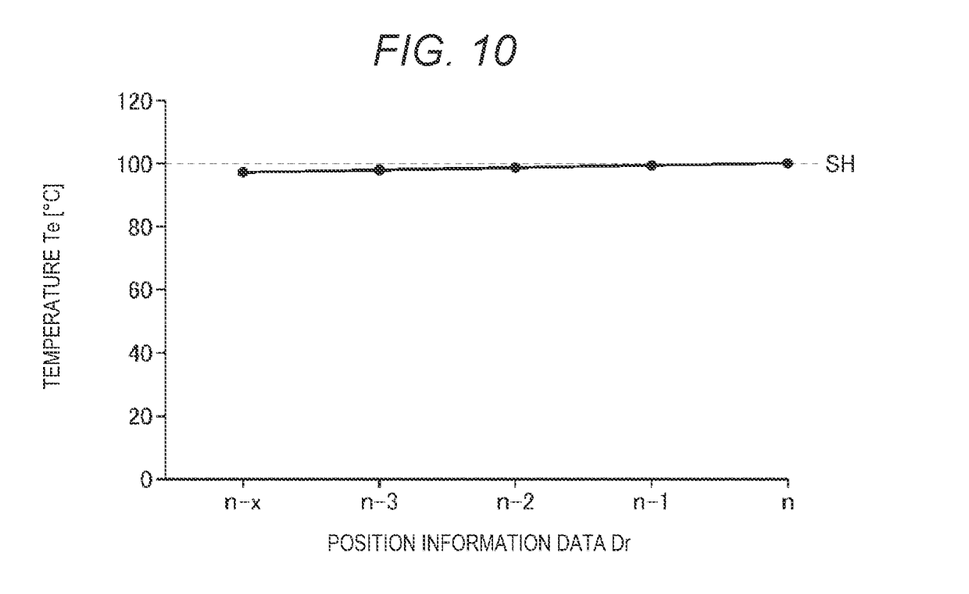
FIG. 10 is a graph for explanation of the method of detecting the abnormality of the arithmetic processing unit of the drive device.

Note that "abnormality of drive device 41" is not particularly limited to, but includes the following examples. For example, as shown in FIG. 7, when the output of the rotation amount R corresponding to the nth request signal Sr sharply increases relative to the rotation amount R corresponding to the immediately preceding (n−1)th request signal Sr, the arithmetic processing unit 641 senses an abnormality of the optical encoder 61. Or, for example, as shown in FIG. 8, when the number of counts indicating the time Ti corresponding to the nth request signal Sr sharply increases relative to the number of counts indicating the time Ti corresponding to the immediately preceding (n−1)th request signal Sr, the arithmetic processing unit 641 doubts a failure of reception of the request signal Sr and senses an abnormality such as disconnection of the wire 66 or generation of noise. Or, for example, as shown in FIG. 9, when the temperature Te corresponding to the nth request signal Sr sharply increases relative to the temperature Te corresponding to the immediately preceding (n−1)th request signal Sr, the arithmetic processing unit 641 senses an abnormality of the temperature sensor 69. Or, for example, as shown in FIG. 10, when the temperature Te exceeds a threshold SH, the arithmetic processing unit 641 senses an abnormality of the motor 5. As described above, according to the drive device 41, which element causes an abnormality may be estimated based on a parameter that abruptly changes. Accordingly, the subsequent abnormality analysis is easier.

"When the robot control apparatus 3 transmits the error flag Fe" is not particularly limited to, but includes e.g. "when position information data Dr corresponding to the request signal Sr is not transmitted", "when the rotation amount R contained in position information data Dr is largely apart from the position command", "when an abnormality occurs in another element than the drive device 41".

As above, the robot system 1 is explained. As described above, the motor control angle sensor 6 contained in the robot system 1 has the sensor 60 that outputs the signal according to driving of the motor 5, the arithmetic processing unit 641, the motion history temporary memory unit 642, and the motion history storage unit 643. The arithmetic processing unit 641 generates the position information data Dr containing the rotation amount R as the position of the motor 5 acquired based on the signal output from the sensor 60 and the time Ti when the rotation amount R is acquired, repeats processing of storing the generated position information data Dr in the motion history temporary memory unit 642, and, when an abnormality is sensed or a signal reporting an abnormality is received from the robot control apparatus 3 as the external apparatus, stores the position information data Dr stored in the motion history temporary memory unit 642 in the motion history storage unit 643. According to the configuration, the position information data Dr at the last plurality of times containing the time when the abnormality is sensed or the signal reporting the abnormality is received from the robot control apparatus 3 is stored even when the power is turned off. Accordingly, the position information data Dr stored in the motion history storage unit 643 is subsequently analyzed, and thereby, a cause of the abnormality can be analyzed. Here, the motor control angle sensor 6 has a smaller size than the robot control apparatus 3, and thereby, the transport cost for abnormality analysis may be reduced and flexibility for analysis may be improved compared to those in related art. Particularly, the position information data Dr contains the time Ti, and thereby, for example, whether the abnormality is an abnormality of the sensor 60 or an abnormality in communication with the robot control apparatus 3 may be easily determined.

Further, as described above, the arithmetic processing unit 641 generates the position information data Dr according to the request signal Sr from the robot control apparatus 3 and stores the generated position information data Dr in the motion history temporary memory unit 642. Thereby, unnecessary generation and storage of the position information data Dr in the motion history temporary memory unit 642 may be suppressed.

Further, as described above, the arithmetic processing unit 641 generates the position information data Dr according to the request signal Sr from the robot control apparatus 3 and transmits the generated position information data Dr to the robot control apparatus 3. Thereby, unnecessary generation and transmission of the position information data Dr to the robot control apparatus 3 may be suppressed.

As described above, the motion history temporary memory unit 642 is formed using the ring buffer. Thereby, the latest position information data Dr may be sequentially stored. Further, the capacity of the motion history temporary memory unit 642 may be reduced, and the cost of the motor control angle sensor 6 may be reduced.

As described above, the motor control angle sensor 6 has the temperature sensor 69 that detects the temperature Te of the motor 5. The arithmetic processing unit 641 generates the position information data Dr containing the temperature Te of the motor 5 at the time Ti in addition to the rotation amount R and the time Ti. Thereby, the motor control angle sensor 6 may sense not only an abnormality of the sensor 60 but also an abnormality of the motor 5.

As described above, the arithmetic processing unit 641, the motion history temporary memory unit 642, and the motion history storage unit 643 are contained in the single semiconductor device 64. Thereby, the motor control angle sensor 6 may be downsized.

As described above, the drive device 41 as the motor control system has the motor 5, the sensor 60 that outputs the signal according to driving of the motor 5, the arithmetic processing unit 641, the motion history temporary memory unit 642, the motion history storage unit 643, and the robot control apparatus 3 as the control apparatus that controls driving of the motor 5. The arithmetic processing unit 641 generates the position information data Dr containing the rotation amount R as the position of the motor 5 acquired based on the signal output from the sensor 60 and the time Ti when the rotation amount R is acquired, repeats processing of storing the generated position information data Dr in the motion history temporary memory unit 642, and, when an abnormality is sensed or a signal reporting an abnormality is received from the robot control apparatus 3, stores the position information data Dr stored in the motion history temporary memory unit 642 in the motion history storage unit 643. According to the configuration, the position information data Dr at the last plurality of times containing the time when the abnormality is sensed or the signal reporting the abnormality is received from the robot control apparatus 3 is stored even when the power is turned off. Accordingly, the position information data Dr stored in the motion history storage unit 643 is subsequently analyzed, and thereby, a cause of the abnormality can be analyzed. Here, the drive device 41 has a smaller size than the robot control apparatus 3, and thereby, the transport cost for abnormality analysis may be reduced and flexibility for analysis may be improved compared to those in related art.

As described above, in a control method for the drive device 41 as the motor control system having the motor 5, the sensor 60 that outputs the signal according to driving of the motor 5, the arithmetic processing unit 641, the motion history temporary memory unit 642, the motion history storage unit 643, and the robot control apparatus 3 that controls driving of the motor 5, the arithmetic processing unit 641 generates the position information data Dr containing the rotation amount R of the motor 5 acquired based on the signal output from the sensor 60 and the time Ti when the rotation amount R is acquired at each time when receiving the request signal Sr from the robot control apparatus 3, repeats processing of storing the generated position information data Dr in the motion history temporary memory unit 642, and, when an abnormality is sensed or a signal reporting an abnormality is received from the robot control apparatus 3, stores the position information data Dr stored in the motion history temporary memory unit 642 in the motion history storage unit 643. According to the method, the position information data Dr at the last plurality of times containing the time when the abnormality is sensed or the signal reporting the abnormality is received from the robot control apparatus 3 is stored even when the power is turned off. Accordingly, the position information data Dr stored in the motion history storage unit 643 is subsequently analyzed, and thereby, a cause of the abnormality can be analyzed. Here, the drive device 41 has a smaller size than the robot control apparatus 3, and thereby, the transport cost for abnormality analysis may be reduced and flexibility for analysis may be improved compared to those in related art.

As above, the motor control angle sensor, the motor control system, and the control method for the motor control angle sensor are explained based on the illustrated embodiments, however, the present disclosure is not limited to those. The configurations of the respective parts may be replaced by arbitrary configurations having the same functions. Or, any other configuration may be added to the present disclosure. In the above described embodiments, examples in which the motor control angle sensor, the motor control system, and the control method for the motor control angle sensor are applied to the robot system are explained, however, the motor control angle sensor, the motor control system, and the control method for the motor control angle sensor may be applied to other various electronic apparatuses than the robot system.

Figure 11:
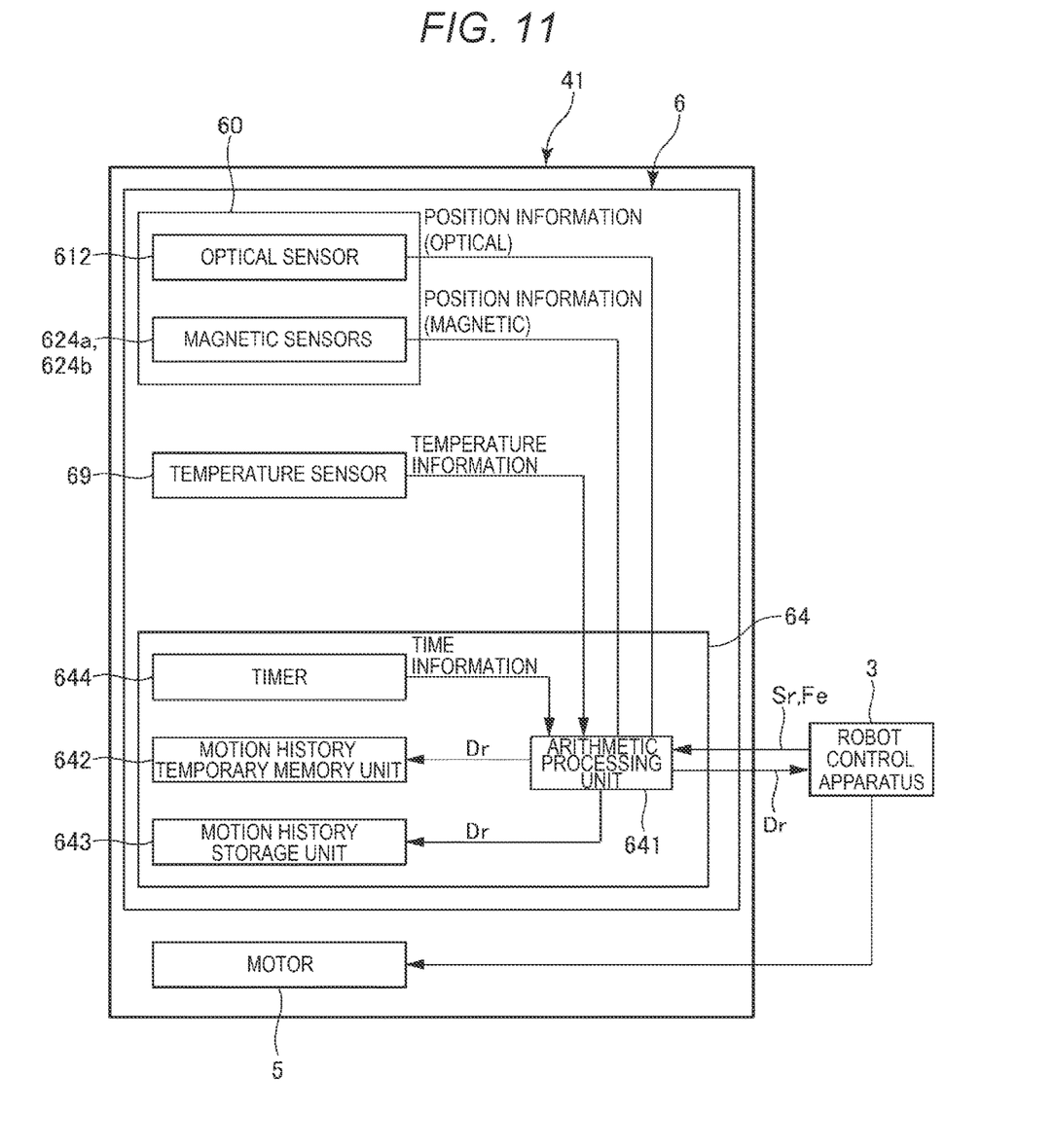
FIG. 11 is a block diagram showing a modified example of the drive device.
Figure 12:
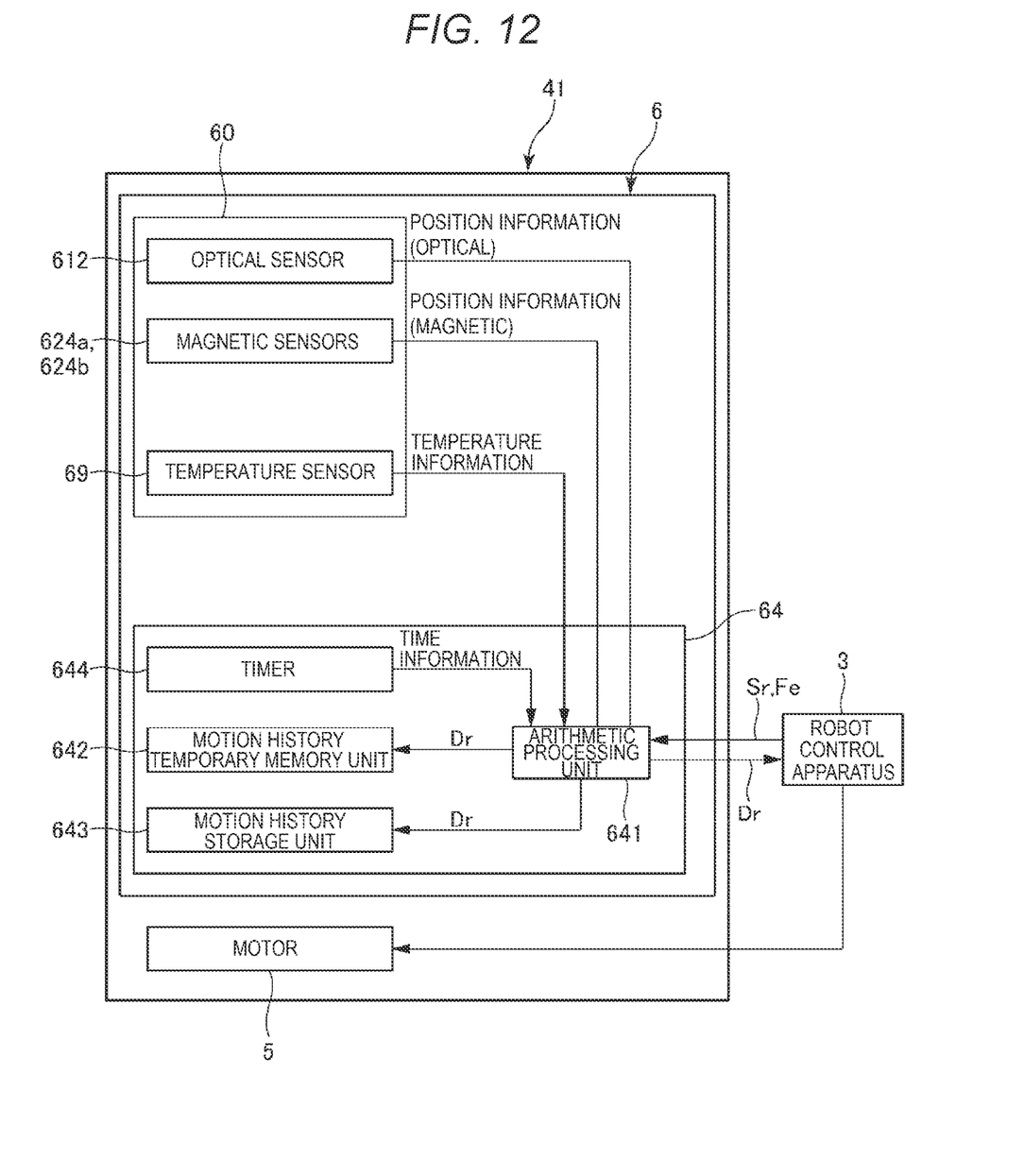
FIG. 12 is a block diagram showing a modified example of the drive device.
Figure 13:
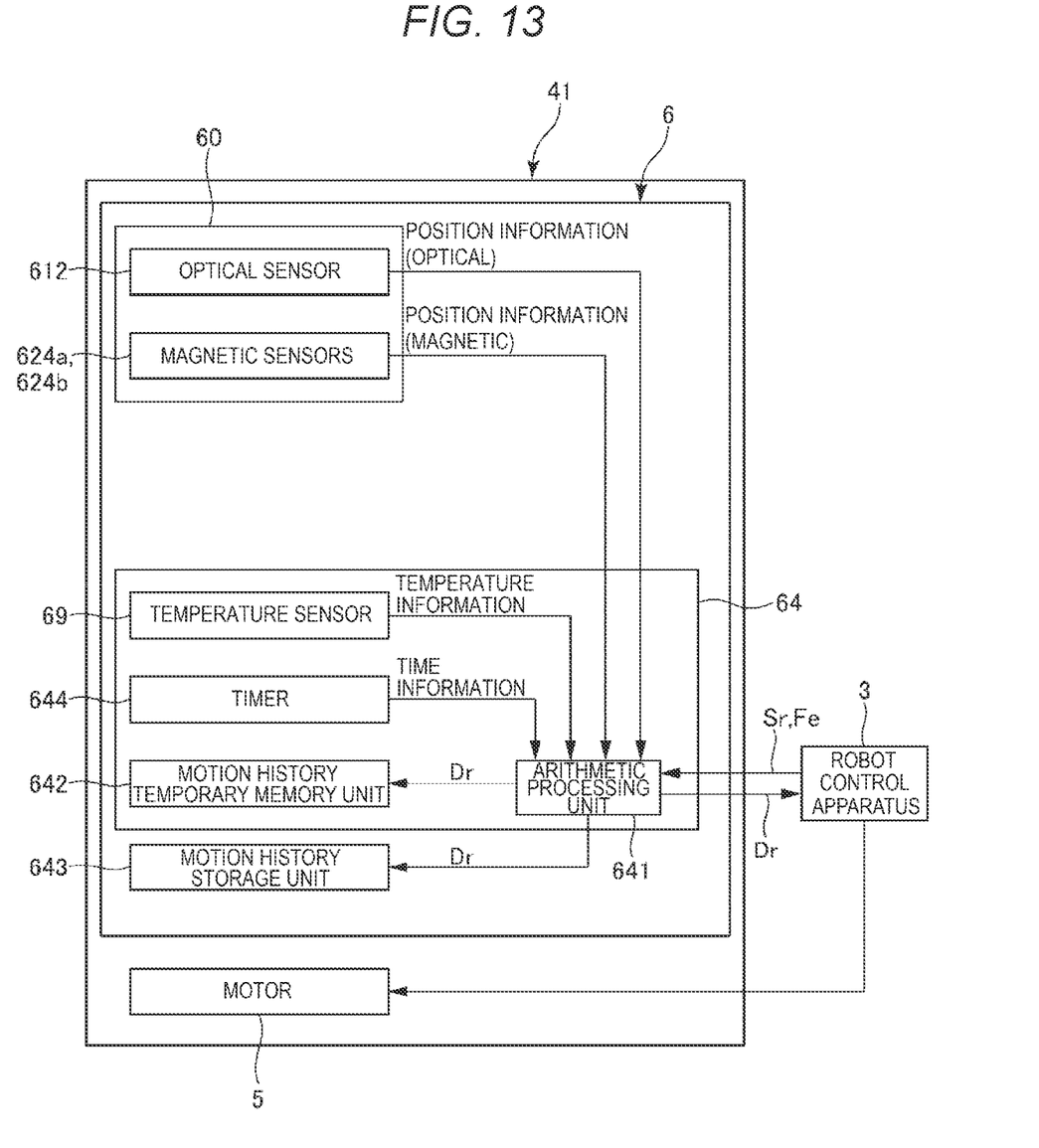
FIG. 13 is a block diagram showing a modified example of the drive device.

In the above described embodiments, the temperature sensor 69 is placed within the semiconductor device 64, however, for example, as shown in FIGS. 11 and 12, may be placed outside of the semiconductor device 64. Further, in the above described embodiments, the motion history storage unit 643 is placed within the semiconductor device 64, however, for example, as shown in FIG. 13, may be placed outside of the semiconductor device 64.

What is claimed is:
1. A motor control angle sensor assembly comprising:
    a housing;
    a sensor element housed in the housing, the sensor element being configured to output a signal according to driving of a motor, the motor having a drive shaft, the drive shaft having first and second ends opposite to each other;
    an arithmetic processor housed in the housing;
    a motion history temporary buffer housed in the housing, and
    a motion history memory housed in the housing, wherein the arithmetic processor is configured to:
        generate position information data containing a position of the motor acquired based on the signal output from the sensor element and a time when the position is acquired;
        repeal processing of storing the generated position information data in the motion history temporary buffer several times; and
        store the position information data stored in the motion history temporary buffer in the motion history memory when an abnormality is sensed or a signal reporting an abnormality is received from an external apparatus, and
    the motor control angle sensor is disposed at the first end of the drive shaft of the motor, and a robot arm is disposed at the second end of the drive shaft of the motor.
2. The motor control angle sensor assembly according to claim 1, wherein
    the arithmetic processor is configured to generate the position information data according to a request signal from the external apparatus.
3. The motor control angle sensor assembly according to claim 1, wherein
    the arithmetic processor is configured to generate the position information data according to a request signal from the external apparatus and transmit the generated position information data to the external apparatus.
4. The motor control angle sensor assembly according to claim 1, wherein
    the motion history temporary buffer is a ring buffer.

5. The motor control angle sensor assembly according to claim 1, further comprising a temperature sensor element configured to detect a temperature of the motor, wherein
the arithmetic processor is configured to generate the position information data containing the temperature of the motor at the time in addition to the position and the time.

6. The motor control angle sensor assembly according to claim 1, wherein
the arithmetic processor, the motion history temporary buffer, and the motion history memory are contained in a single semiconductor device.

7. A motor control system comprising:
a motor, the motor having a drive shaft, the drive shaft having first and second ends opposite to each other;
a motor control angle sensor assembly, the motor control angle sensor assembly including:
a housing;
a sensor element housed in the housing, the sensor element being configured to output a signal according to driving of the motor;
an arithmetic processor housed in the housing;
a motion history temporary buffer housed in the housing; and
a motion history memory housed in the housing; and
a controller configured to control the driving of the motor, wherein
the arithmetic processor is configured to:
generate position information data containing a position of the motor acquired based on the signal output from the sensor element and a time when the position is acquired;
repeat processing of storing the generated position information data in the motion history temporary buffer several times; and
store the position information data stored in the motion history temporary buffer in the motion history memory when an abnormality is sensed or a signal reporting an abnormality is received from an external apparatus, and the motor control angle sensor assembly is disposed at the first end of the drive shaft of the motor, and a robot arm is disposed at the second end of the drive shaft of the motor.

8. A control method for a motor control system, the motor control system having:
a motor, the motor having a drive shaft, the drive shaft having first and second ends opposite to each other;
a motor control angle sensor assembly, the motor control angle sensor assembly including:
a housing;
a sensor element housed in the housing, the sensor element being configured to output a signal according to driving of the motor;
an arithmetic processor housed in the housing;
a motion history temporary buffer housed in the housing; and
a motion history memory housed in the housing, and
a controller configured to control the driving of the motor,
the method comprising:
generating position information data containing a position of the motor acquired based on the signal output from the sensor element and a time when the position is acquired at each time when receiving a request signal from the controller;
repeating processing of storing the generated position information data in the motion history temporary buffer several times; and,
when an abnormality is sensed or a signal reporting an abnormality is received from the controller, storing the position information data stored in the motion history temporary buffer in the motion history memory by the arithmetic processor,
wherein the motor control angle sensor assembly is disposed at the first end of the drive shaft of the motor, and a robot arm is disposed at the second end of the drive shaft of the motor.

* * * * *